Patented Apr. 3, 1934

1,953,583

UNITED STATES PATENT OFFICE 1,953,583

RESINOUS COMPOSITION AND PROCESS OF APPLYING SAME

Theodore F. Bradley, Westfield, N. J., assignor to American Cyanamid Company, New York, N. Y., a corporation of Maine No Drawing. Application November 25, 1929, Serial No. 409,765

8 Claims. (Cl. 91—68)

This invention relates to compositions containing resins of the polyhydric alcohol-polybasic acid type, and to methods of using the same.

Various polybasic acid-polyhydric alcohol resins or resinous materials have been prepared and used in the past for impregnating and coating materials such as paper and the like. However, in this connection, these resins are sometimes too soft and of too low melting point with the result that the resin surface is sticky or may become so upon pressure of the fingers. To overcome this stickiness the resins have been admixed with nitrocellulose, which serves as a hardening agent. This procedure not only involves the use of costly solvents but nitrocellulose itself is a considerable item of expense and its use also leaves much to be desired in the finished product.

It is one of the objects of the present invention to overcome this stickiness of the resinous coating in an economical manner with the elimination of nitrocellulose. It is a further object to avoid the use of expensive organic solvents or solvent mixtures without deleteriously affecting the finished coating or impregnated article.

These and other objects are attained by mixing with the polybasic acid-polyhydric alcohol resinous material, a waxy substance of the nature of spermaceti, and applying this mixture in any suitable manner.

A specific resin was prepared by bringing about a reaction of the following ingredients at a temperature from 150° to 230° C. until a sample upon cooling sets to a hard, non-sticky resin:

*Example 3*

| | Parts by weight |
|---|---|
| Dynamite grade 98% glycerol | 100 |
| Phthalic anhydride | 160 |
| Distilled cottonseed oil fatty acids | 90 |

This material has an acid number of about 20 to 25 and a softening point of 62 to 66° C., as determined by the A. S. T. M. ring and ball method.

The resin so prepared was mixed with spermaceti wax and the mixture dissolved in toluene in the following proportions:

| | Parts by weight |
|---|---|
| Spermaceti wax | 1.8 |
| Resin of Example 1 | 18.0 |
| Toluene | 80.0 |
| Total | 99.8 |

Glassine paper was dipped into a portion of the solution and after draining, was dried at 80° C. for ten minutes. The dried paper was transparent and non-sticky at room temperature, having good slip. The term "slip" refers to a property of a coated paper or the like in which two or more surfaces of which, when in immediate contact with each other, slide easily upon one another without any adhesion or sticking. The paper was found to be substantially grease-proof and of high water resistance.

Harder compositions are somewhat more suitable for certain purposes and the following illustrate materials of this type:

*Example 1*

| | Parts by weight |
|---|---|
| Resin of Example 1 | 1 |
| Oxidized rosin ester | 4 |
| Toluene | 20 |
| Spermaceti wax | ¼ |

The rosin ester used was an oxidized material having a softening point of about 100° C.

*Example 2*

| | Parts by weight |
|---|---|
| Resin of Example 1 | 1 |
| Rosin resin | 5 |
| Spermaceti wax | 0.3 |
| Toluene | 22 |

The rosin resin referred to was a synthetic resin prepared by reaction of a mixture of the following ingredients in much the same manner as described for the preparation of the synthetic resin of Example 1:

| | Parts by weight |
|---|---|
| Rosin | 126½ |
| Phthalic anhydride | 32 |
| 98% glycerol | 31½ |

The resin so prepared is a hard, somewhat brittle material having an acid number of 12 to 18 and having a softening point of 84° to 89° C. (A. S. T. M. ring and ball method.)

These compositions are soluble in toluene and other cheap hydrocarbon solvents and may be used in solutions of this type, as described. However, where even these solvents are undesirable, other means may be employed.

In place of the toluene or other hydrocarbon solutions described, I may make the mixture of resin or resins and wax and apply the mixture in a molten condition. For instance, paper or the like may be passed through or dipped into a bath of the molten mixtures and then run through a calender or squeeze rolls, preferably heated. The coated or impregnated material may be air-dried or may be baked.

Still another method of applying my compositions consists in preparing them in the form of aqueous emulsions. A composition of this type is as follows:

| | Parts by weight |
|---|---|
| Oxidized rosin ester | 40 |
| Resin of Example 1 | 10 |
| Spermaceti wax | 2.5 |
| Conc. ammonium hydroxide | 3 |
| Oleic acid | 3 |
| Water | 300 |

This composition was prepared by grinding the resins and wax together to a fine powder and adding this powder to the water and other ingredients. The mixture was maintained at 95° C. and was stirred continuously with high speed agitation. So-called colloid mills and homogenizers may be used advantageously for the preparation of these materials.

In place of spermaceti wax I may use other materials of the spermaceti type. Chemically, spermaceti wax consists chiefly of cetyl palmitate, and is readily saponifiable. It is not contaminated by large amounts of hydrocarbons and other unsaponifiable matter. Likewise it was found that relatively pure esters of the higher monohydric aliphatic alcohols with the higher fatty acids are effective in place of the spermaceti wax or a portion thereof. For instance, among these substances may be mentioned the stearates and palmitates of cetyl, ceryl, myricyl and similar alcohols. The oleic, linoleic and oleomargaric acid esters of such alcohols are also suitable for the purposes described.

My invention is applicable to mixtures of the waxy materials with any of the polybasic acid-polyhydric alcohol resins falling in the range of synthetic resinous esters. I mean to include those which may be derived from polyhydric alcohols such as ethylene glycol and its higher homologues, di-ethylene glycol and its higher homologues, glycerol, polyglycerols, pentaerythritol, mannitol and other forms of these polyhydric alcohols, when combined with polybasic carboxylic acids of both the aromatic and aliphatic groups, with or without modification by rosin or natural resins or resin acids, fatty acids, vegetable oils or their equivalents.

The synthetic resin and wax mixtures, while described in connection with their application to paper, for which they are particularly suitable, may be used for many other purposes. For instance, they have value in lacquer or coating compositions for use on metallic or wooden articles or objects and may also be used for coating or impregnating various porous materials. Of course, it is to be understood, that pigments, dyes or other coloring materials and the like may be mixed with the compositions if desired.

It will be understood that the invention is susceptible of many modifications and changes other than the details set forth, and it is only limited in accordance with the appended claims.

I claim:—

1. A composition comprising a polybasic acid-polyhydric alcohol resin and a waxy ester of a higher monohydric aliphatic alcohol selected from a group consisting of cetyl, ceryl, and myricyl alcohols and a higher fatty acid selected from a group consisting of stearic, palmitic, oleic, linoleic, and eleomargaric acids.

2. A composition comprising a polybasic acid-polyhydric alcohol resin and a cetyl palmitate.

3. A composition comprising a polybasic acid-polyhydric alcohol resin and spermaceti.

4. A process of treating materials which comprises applying thereto, a composition containing a polybasic acid-polyhydric alcohol resin and a waxy ester of a higher monohydric aliphatic alcohol selected from a group consisting of cetyl, ceryl and myricyl alcohols and a higher fatty acid selected from a group consisting of stearic, palmitic, oleic, linoleic, and eleomargaric acids.

5. A process of treating materials which comprises applying thereto, a composition containing a solution of a polyhydric alcohol-polybasic acid resin and a waxy ester of a higher monohydric aliphatic alcohol selected from a group consisting of cetyl, ceryl and myricyl alcohols and a higher fatty acid selected from a group consisting of stearic, palmitic, oleic, linoleic, and eleomargaric acids.

6. A process of treating materials which comprises applying thereto, a composition containing an emulsion in water of a polyhydric alcohol-polybasic acid resin and a waxy ester of a higher monohydric aliphatic alcohol selected from a group consisting of cetyl, ceryl and myricyl alcohols and a higher fatty acid selected from a group consisting of stearic, palmitic, oleic, linoleic, and eleomargaric acids.

7. A process of treating paper which comprises applying to the paper a composition containing a polybasic acid-polyhydric alcohol resin and a waxy ester of a higher monohydric aliphatic alcohol selected from a group consisting of cetyl, ceryl and myricyl alcohols and a higher fatty acid selected from a group consisting of stearic palmitic, oelic, linoleic, and eleomargaric acids.

8. Transparent paper carrying a coating containing a mixture of polybasic acid-polyhydric alcohol resin and a waxy ester of a higher monohydric aliphatic alcohol selected from a group consisting of cetyl, ceryl and myricyl alcohols and a higher fatty acid selected from a group consisting of stearic, palmitic, oleic, linoleic, and eleomargaric acids.

THEODORE F. BRADLEY.